United States Patent [19]

Tanaka et al.

[11] Patent Number: 5,355,432
[45] Date of Patent: * Oct. 11, 1994

[54] SPEECH RECOGNITION SYSTEM

[75] Inventors: Miyuki Tanaka; Masao Watari; Yasuhiko Kato, all of Kanagawa, Japan

[73] Assignee: Sony Corporation, Tokyo, Japan

[*] Notice: The portion of the term of this patent subsequent to Mar. 26, 2008 has been disclaimed.

[21] Appl. No.: 928,448

[22] Filed: Aug. 12, 1992

[30] Foreign Application Priority Data

Aug. 30, 1991 [JP] Japan .................................. 3-220732

[51] Int. Cl.[5] .............................................. G10L 5/06
[52] U.S. Cl. ...................................... 395/2.43; 381/41
[58] Field of Search ..................... 381/41, 43; 395/2.43

[56] References Cited

U.S. PATENT DOCUMENTS 5,003,601 3/1991 Watari et al. ........................... 381/43

Primary Examiner—Allen R. MacDonald
Assistant Examiner—Richard J. Kim
Attorney, Agent, or Firm—Lewis H. Eslinger; Jay H. Maioli

[57] ABSTRACT

A speech recognition system includes an acoustic analyzer which produces a time sequence of acoustic parameters from an input speech signal in an utterance boundary thereof, and estimates a trajectory in a parameter space from the time sequence of acoustic parameters. The trajectory is re-sampled in the parameter space at predetermined constant intervals sequentially each time the acoustic parameters are produced by the acoustic analyzing means, thereby producing an input utterance pattern. The input utterance pattern is matched with reference speech patterns to recognize the input speech signal. The speech recognition system also has an utterance boundary detector for detecting the utterance boundary of the input speech signal. The trajectory is re-sampled while the utterance boundary is being detected by the utterance boundary detector.

2 Claims, 13 Drawing Sheets

SPEECH RECOGNITION SYSTEM

BACKGROUND OF THE INVENTION

1. Field of the Invention

The present invention relates to a speech recognition system for recognizing an acoustic speech pattern through pattern matching with reference patterns, and more particularly to a speech recognition system which produces acoustic parameters from an input speech signal following utterance detection in each frame period.

2. Description of the Prior Art

Speech sounds uttered by human speakers vary with time to serve as a symbolic representation of information in the form of words and phrases. There have been developed speech recognition apparatus for automatically recognizing acoustic speech signals produced by human beings. While various efforts have heretofore been directed toward improvements in automatic speech recognition, present speech recognizers are far from achieving speech recognition capabilities comparable to those of human beings. Most practical speech recognition systems that are available today operate to effect pattern matching between an input speech pattern and reference speech patterns under certain conditions.

FIG. 1 of the accompanying drawings shows a conventional speech recognition system. The speech recognition system has an acoustic analyzer 2 which receives an input speech signal from a microphone 1. The acoustic analyzer 2 extracts acoustic parameters indicative of features of the input speech pattern, and also detects word or utterance boundaries thereof. Various processes are known for extracting such acoustic parameters from an input acoustic speech signal. According to one process, a plurality of channels each comprising a bandpass filter and a rectifier are provided for respective different passbands, and the bandpass filter bank produces an output signal representative of a time-dependent change in a spectral pattern of the input acoustic speech signal. The utterance boundaries are detected based on the power of the speech signal from the microphone 1 and also the number of zero crossings of the speech signal. The acoustic parameters can be represented by their time sequence $Pi(n)$ where $i=1, 2, \ldots, I$ (I is the number of channels having respective bandpass filters) and $n=1, 2, \ldots, N$ (N is the number of frames used for speech recognition in the utterance boundary that is detected).

The acoustic parameter time sequence $Pi(n)$ is supplied from the acoustic analyzer 2 to a mode selector 3 which may comprise a switch, for example. When the mode selector 3 is shifted to a contact terminal A, the speech recognition system is in a register mode. In the register mode, the acoustic parameter time sequence $Pi(n)$ is stored as recognition parameters in a reference pattern memory 4, so that the acoustic speech pattern of the talker is stored as a reference speech pattern or "template" in the reference pattern memory 4. Generally, registered reference speech patterns have different frame numbers because of different speaking rates and different word durations.

When the mode selector 3 is shifted to a contact terminal B, the speech recognition system is in a recognition mode. In the recognition mode, the acoustic parameter time sequence of an input speech signal which is uttered by the speaker is supplied from the acoustic analyzer 2 to an input speech pattern memory 5 and temporarily stored therein. The input speech pattern stored in the input speech pattern memory 5 is then supplied to a distance calculator 6, which calculates the magnitudes of differences between the input speech pattern and the reference speech patterns of a plurality of words read out of the reference pattern memory 4. A minimum difference detector 7 connected to the distance calculator 6 then detects the word whose reference speech pattern has a minimum difference with the input speech pattern. The distance calculator 6 and the minimum difference detector 7 make up a pattern matcher 8 for recognizing the input word uttered by the speaker.

In this manner, an unknown utterance can be recognized by pattern matching between the input speech pattern and some registered reference speech patterns.

It is known that different utterances of the same word or phrase may have their spectral patterns continuing in respective different durations or including speech events whose timing is not the same for the utterances. For example, the Japanese word "HAI", which is equivalent to "yes" in English, may be uttered in some cases as "HAAAI" that continues in a prolonged duration. If the utterance "HAAAI" is applied as an input speech pattern to the speech recognition system, then its distance from a reference speech pattern or template for the word "HAI" is so large that the input speech sound will be recognized as a word different from "HAI".

Prior to the pattern matching, therefore, it is necessary to effect time normalization or dynamic time warping to realign portions of an utterance with corresponding portions of the template. The time normalization is an important process for higher recognition accuracy.

One method for carrying out such time normalization is dynamic programming (DP) matching as disclosed in Japanese laid-open patent publication No. 50-96104, for example. According to the DP matching, rather than using multiple reference speech patterns extending over different time durations, a number of time-normalized reference speech patterns are generated with a warping function, and the distances between the reference patterns and an input utterance pattern are determined, with a minimum distance being detected for recognizing the input utterance.

In the DP matching method, the number of frames of the registered reference speech patterns is not fixed. Furthermore, it is necessary to effect DP matching between all the registered reference speech pattern and an input utterance pattern. Therefore, if there are more words to be recognized, then the DP matching method requires more calculations.

The DP matching tends to yield a recognition error between partly analogous utterance patterns because the process relies for speech recognition upon the steady regions of utterances where the spectral pattern does not vary with time.

There has been proposed a process for time normalization which is free from the above drawbacks, as disclosed in Japanese patent application No. 59-106178, for example.

The proposed time normalization process will briefly be described below. An acoustic parameter time sequence $Pi(n)$ is composed of a sequence of dots in a parameter space. For example, if an input utterance to be recognized is "HAI" and an acoustic analyzer has two bandpass filters with $$Pi(n) = (P1\ P2),$$

then the acoustic parameter time sequence of the input utterance is composed of a sequence of dots in a two-dimensional parameter space as shown in FIG. 2 of the accompanying drawings. The input utterance includes an unsteady region 9 having coarsely distributed dots and a quasi-steady region 10 having closely distributed dots. If an input utterance is fully steady, then its parameters do not vary, and the dots stay together in one spot in the parameter space.

The different time durations of utterances due to different speaking rates are primarily caused by different dot sequence densities of the quasi-steady regions 10 thereof, but not largely affected by the time durations of the unsteady regions 9 thereof.

As shown in FIG. 3 of the accompanying drawings, a path or trajectory 11 is estimated as a continuous curve approximating the overall acoustic parameter time sequence Pi(n). The trajectory 11 remains almost unchanged regardless of different time durations of utterances.

In view of the aforesaid property of the trajectory 11, there has also been proposed a process for time normalization, as disclosed in Japanese patent application No. 59-106177, for example.

According to the other proposed time normalization process, a trajectory 11 is estimated as a continuous curve Pi(s) from a start point Pi(1) of the acoustic parameter time sequence Pi(n) to an end point Pi(N) thereof, and the length L of the curve Pi(s) is determined, as shown in FIG. 4 of the accompanying drawings. The trajectory 11 is then sampled again at intervals Le therealong. Specifically, if the trajectory 11 is at be re-sampled at M points 12 therealong, then it is re-sampled at intervals Le each indicated by:

$$Le = L/(M-1).$$

A parameter time sequence Qi(m) (i = 1, 2, ..., I, m = 1, 2, ..., M) representative of re-sampled points of the trajectory 11 possesses basic information of the trajectory 11, and remains almost unchanged regardless of different utterance time durations. Consequently, the parameter time sequence Qi(m) is time-normalized.

The parameter time sequence Qi(m) thus produced is registered as a reference speech pattern. To recognized any unknown input utterance pattern, it is also produced as a parameter time sequence Qi(m). The distance between the input utterance and reference speech patterns is determined based on these parameter time sequences Qi(m). A minimum distance is detected for recognizing the input utterance while any different time durations between utterances are being normalized.

According to the above time normalization process, the number of frames of a parameter time sequence Qi(m) is always M irrespective of different speech rates and different time durations of words when they are registered, and the parameter time sequence Qi(m) is time-normalized. Therefore, the distance between input utterance and reference speech patterns can be calculated by the simple process for calculating the Chebyshev's distance.

Since the above time normalization process attaches more importance to unsteady regions of utterances, it is less subject to a recognition error between partly analogous utterance patterns than the DP matching process.

Furthermore, the normalized parameter time sequence Qi(m) does not contain information indicative of different speaking rates. Thus, the time normalization process can easily handle global features of a parameter transition structure in the parameter space, lending itself to various methods effective for speaker-independent speech recognition.

The time normalization process described above is referred to as a NAT (Normalization Along Trajectory) process.

Japanese patent application No. 59-109172, for example, discloses a speech recognition system which carries out the NAT process a plurality of times to prevent a word recognition rate from being lowered due to utterance fluctuations and partial word similarities.

FIG. 5 of the accompanying drawings illustrates the disclosed speech recognition system in block form.

As shown in FIG. 5, an acoustic analyzing unit 2a receives an input speech signal from a microphone 1 and extracts acoustic parameters indicative of features of the input speech pattern at certain time intervals referred to as frame periods.

The feature parameter in each frame period is sent from the acoustic analyzing unit 2a to an utterance boundary detector 2b, which determines start and end points of the input utterance. The acoustic analyzing unit 2a and the utterance boundary detector 2b jointly make up an acoustic analyzer 2 equivalent to the acoustic analyzer 2 shown in FIG. 1.

More specifically, as shown in FIG. 6 of the accompanying drawings, when a speech recognition sequence is started, an utterance boundary of the input utterance is determined within a predetermined interval in one frame period in a step $S_1$. As shown in FIG. 7, the start and end points of the input utterance are determined within an interval $t_1$ which is sufficiently shorter than one frame period of 5.12 msec. Therefore, no processing is carried out in a remaining time interval $t_2$ in the frame period.

Then, a step $S_2$ determines whether the input utterance is finished or not. If not, then the processing goes back to the step $S_1$. If finished, then the processing proceeds to a step $S_3$ in which a first NAT process is carried out by a NAT processor 13 shown in FIG. 5. After the first NAT process, a second NAT process is carried out, if necessary, by the NAT processor 13. The first and second NAT processes will be described later.

After the first and second NAT processes, a pattern matcher 8 matches points of the trajectory 11 of the input utterance at sampling intervals Le with those of a reference speech pattern stored in a reference pattern memory 4 in a step $S_5$. Thereafter, the pattern matcher 8 outputs a recognition result in a step $S_6$, and the speech recognition sequence comes to an end.

Each of the first and second NAT processes will be described below with reference to FIG. 8.

As shown in FIG. 8, the NAT processor 13 first calculates the length L of the trajectory 11 in a step $ST_1$. The length L may be calculated according to the process of calculating the Chebyshev's or Euclidean distance.

Thereafter, the NAT processor 13 determines the distance Le between adjacent sampling points on the trajectory 11 in a step $ST_2$. The distance Le may be determined according to the equation Le = L/(M−1) or Le = L/M where M is the number of sampling points.

Then, the NAT processor 13 sets values k, L' to k = 1, L' = Le, respectively, in a step $ST_3$, and calculates the distance dk between a kth frame and a (k+1)th frame in a step ST$_4$.

The NAT processor 13 determines whether dk−L'≧0 or not in a step ST$_5$. If not, then the NAT processor 13 sets the values k, L' to k=k+1, L'=L'−dk, respectively, in a step ST$_6$, and the processing returns to the step ST4. If dk−L'≧0 in the step ST$_5$, then the NAT processor 13 determines a re-sampling point between two points composed of the data in the kth and (k+1)th frames in a step ST$_7$.

Thereafter, the NAT processor 13 determines whether the number of re-sampling points is equal to a desired number or not in a step ST$_8$. If equal, then the NAT process is ended. If not equal, then the processing goes to a step ST$_9$ in which the NAT processor 13 sets the value L' to L'=L'+Le, and then goes back to the step ST$_5$. In this manner, the NAT processor 13 determines as many re-sampling points as possible between two points composed of the data in the kth and (k+1)th frames.

According to the above NAT process, since the re-sampling intervals are calculated from the length L of the trajectory 11, it is necessary that the length L be determined prior to the NAT process. In order to determine the length L, the start and end points of the input utterance must have been detected.

FIG. 9 of the accompanying drawings shows the speech recognition sequence shown in FIG. 6 as it develops with time. The graph of FIG. 9 has a horizontal axis representing time t and a vertical axis representing a speech level. The speech recognition sequence for recognizing an input utterance 15 requires a time interval t$_3$ in which to detect an utterance boundary from a start point 16 to an end point 17 of the input utterance 15, a time interval t$_4$ in which to effect the NAT process, and a time interval t$_5$ in which to effect the pattern matching, until it outputs a recognition result. The speech recognition sequence is time-consuming because the NAT process is allowed to start after the input utterance 15 is finished.

Furthermore, since the parameter time sequence which has been obtained by acoustically analyzing the input utterance has to be held from the start point 16 to the end point 17 of the input utterance, it is necessary to provide a memory capacity that is large enough to store the necessary parameter time sequence.

OBJECTS AND SUMMARY OF THE INVENTION

In view of the aforesaid difficulties of the conventional speech recognition system, it is an object of the present invention to provide a speech recognition system which shortens the time required to generate patterns and needs a reduced memory capacity for storing data of acoustic parameters.

According to the present invention, there is provided a speech recognition system comprising acoustic analyzing means for producing a time sequence of acoustic parameters from an input speech signal in an utterance boundary thereof, and estimating a trajectory in a parameter space from the time sequence of acoustic parameters, processing means for re-sampling the trajectory in the parameter space at predetermined constant intervals sequentially each time the acoustic parameters are produced by the acoustic analyzing means, thereby producing an input utterance pattern, and matching means for matching the input utterance pattern with reference speech patterns to recognize the input speech signal.

The speech recognition system also includes utterance boundary detecting means for detecting the utterance boundary of the input speech signal, the processing means comprising means for re-sampling the trajectory while the utterance boundary is being detected by the utterance boundary detecting means.

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE PREFERRED EMBODIMENT

Figure 10:
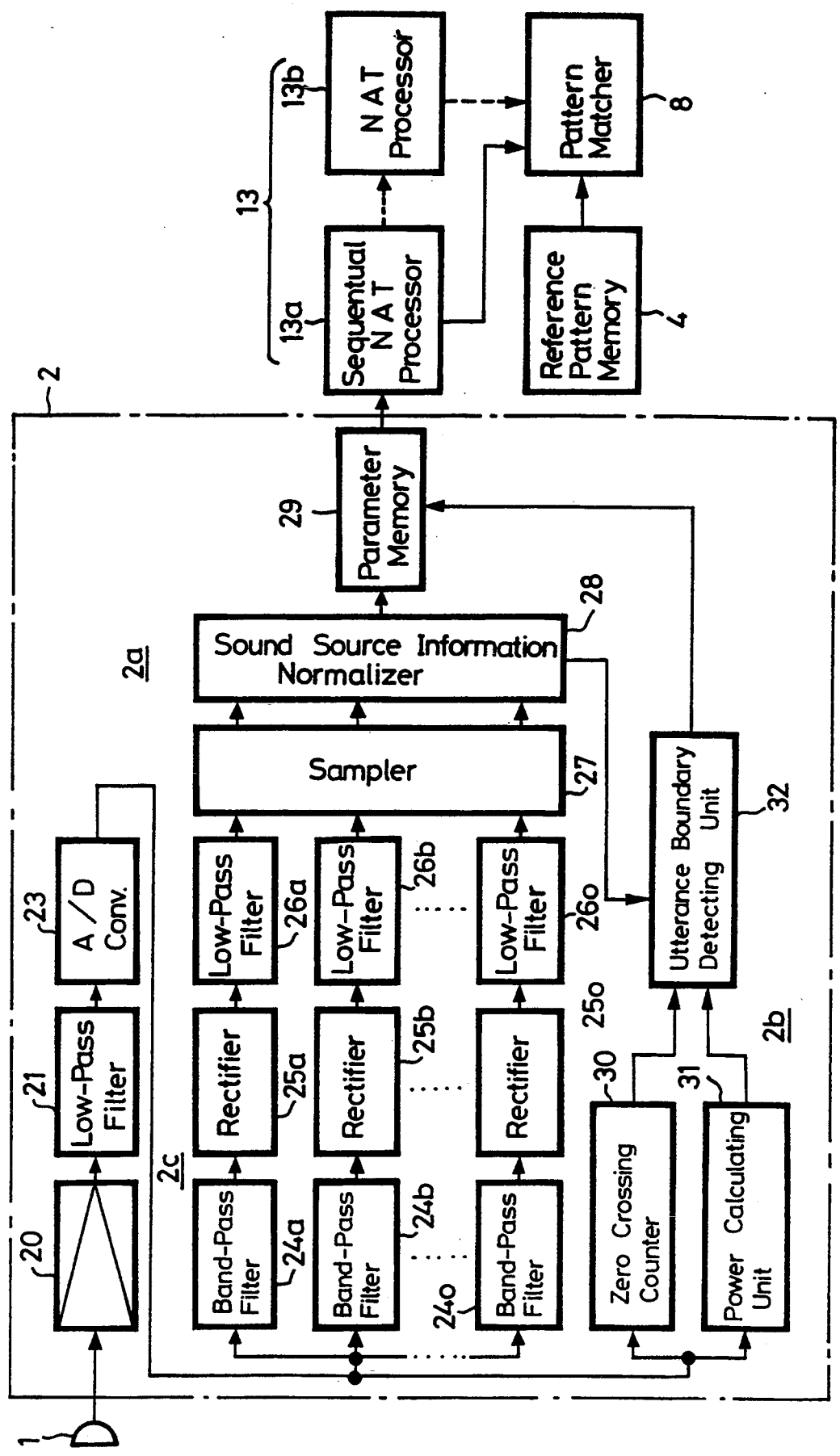
FIG. 10 is a block diagram of a speech recognition system according to the present invention.

FIG. 10 shows in block form an embodiment of the speech recognition system according to the present invention. The speech recognition system includes a 15-channel bandpass filter bank for acoustically analyzing input acoustic speech signals or utterances.

The speech recognition system has an acoustic analyzer 2 composed of an acoustic analyzing unit 2a and an utterance boundary detector 2b. The acoustic analyzing unit 2a includes an amplifier 20, a band-limiting low-pass filter 21, and an A/D converter 23. An input speech signal from a microphone 1 is supplied through the amplifier 20 and the low-pass filter 21 to the A/D converter 23, which converts the input speech signal into a 12-bit digital speech signal with a sampling frequency of, for example, 12.5 KHz. The digital speech signal is supplied from the A/D converter 23 to a 15-channel bandpass filter bank 2c of the acoustic analyzing unit 2a. The 15-channel bandpass filter bank 2c comprises digital bandpass filters 24a, 24b, ..., 24o of respective 15 channels which are supplied with the digital speech signal. The digital bandpass filters 24a, 24b, ..., 24o comprise, for example, 4th-order Butterworth digital filters, for example, having respective passbands equally divided along a logarithmic axis in a frequency range from 250 Hz to 5.5 KHz. The digital bandpass filters 24a, 24b, ..., 24o supply respective output signals to rectifiers 25a, 25b, ..., 25o, which in turn supply rectified output signals respectively to digital low-pass filters 26a, 26b, ..., 26o. The digital low-pass filters 26a, 26b, ..., 26o comprise respective FIR low-pass filters having a cut-off frequency of 52.8 Hz, for example.

The digital low-pass filters 26a, 26b, ..., 26o supply respective output signals which are the output of the acoustic analizer unit 2a to a sampler 27 for extracting features from the input utterance. The sampler 27 samples the output signals from the digital low-pass filters 26a, 26b, ..., 26o in each frame period of 5.12 msec, thus producing a sampled time sequence Ai(n) (i=1, 2, ..., 15; n (frame number)=1, 2, ..., N).

The sampled time sequence Ai(n), or the output signal from the sampler 27, is supplied to a sound source information normalizer 28 which normalizes the input utterance by removing the differences between the vocal chord characteristics of different speakers. The sound source information normalizer 28 produces a speaker-normalized acoustic parameter time sequence Pi(n).

The parameter time sequence Pi(n) is supplied from the sound source information normalizer 28 to an utterance boundary parameter memory 29. The utterance boundary parameter memory 29 stores the speaker-normalized acoustic parameter time sequence Pi(n) in each determined utterance boundary, i.e., in each frame period, in response to an utterance boundary signal from the utterance boundary detector 2b.

The utterance boundary detector 2b comprises a zero crossing counter 30, a power calculating unit 31, and an utterance boundary detecting unit 32. The zero crossing counter 30 and the power calculating unit 31 are supplied with the digital speech signal from the A/D converter 23. The zero crossing counter 30 counts zero crossings of 64 samples of the digital speech signals in each frame period of 5.12 msec., and supplies its count value to a first input terminal of the utterance boundary detecting unit 32.

The power calculating unit 31 determines the power, i.e., the square sum, of the digital speech signal in each frame period at each frame period, and supplies an output power signal to a second input terminal of the utterance boundary detecting unit 32. The utterance boundary detecting unit 32 also has a third input terminal which is supplied with the speaker-normalized acoustic parameter time sequence Pi(n) from the sound source information normalizer 28.

The utterance boundary detecting unit 32 processes the zero crossing count number, the digital speech signal power, and the speaker-normalized acoustic parameter time sequence Pi(n) in each frame period to determine silences, voiced sounds, and unvoiced sounds for detecting an utterance boundary.

The utterance boundary detecting unit 32 supplies an utterance boundary signal indicative of the detected utterance boundary as an output signal from the utterance boundary detector 2b to the utterance boundary parameter memory 29.

The acoustic parameter time sequence Pi(n) that has been stored in the utterance boundary parameter memory 29 in the detected utterance boundary is then read out and supplied to a sequential NAT processing unit 13a of a NAT processor 13. The sequential NAT processing unit 13a supplies a processed output signal to a pattern marcher 8, which matches the supplied signal with a reference speech pattern from a reference pattern memory 4. The output signal from the sequential NAT processing unit 13a may be supplied, as required, to a NAT processing unit 13b of the NAT processor 13, and a processed output signal from the NAT processing unit 13b may be supplied to the pattern matcher 8 for pattern matching.

A speech recognition sequence of the speech recognition system shown in FIG. 10 will be described below with reference to FIG. 11.

When the speech recognition sequence is started, the utterance boundary detector 2a detects an utterance boundary of the input utterance in a first step STE$_1$. After the first step STE$_1$, the utterance boundary parameter memory 29 outputs re-sampled data, and the sequential NAT processing unit 13a effects a sequential NAT process in a second step STE$_2$. The first and second steps STE1, STE2 are carried out in one frame period.

Figure 1:
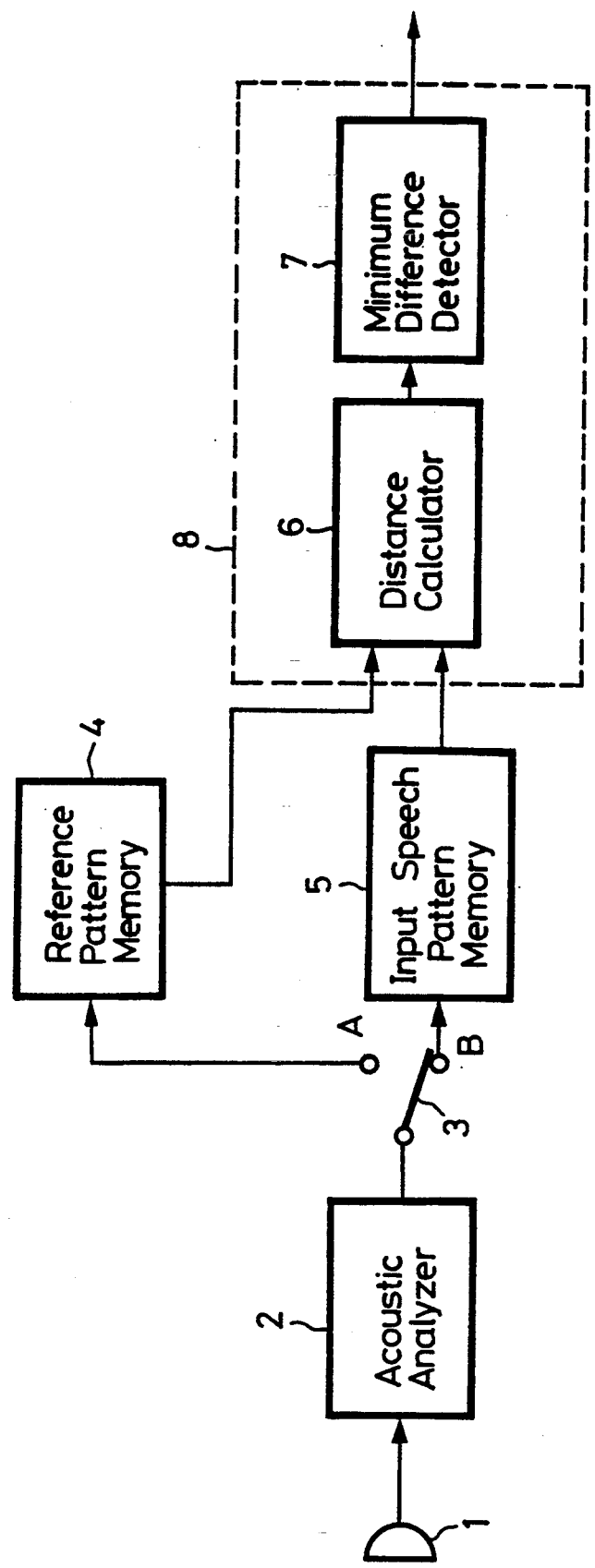
FIG. 1 is a block diagram of a conventional speech recognition system.
Figure 2:
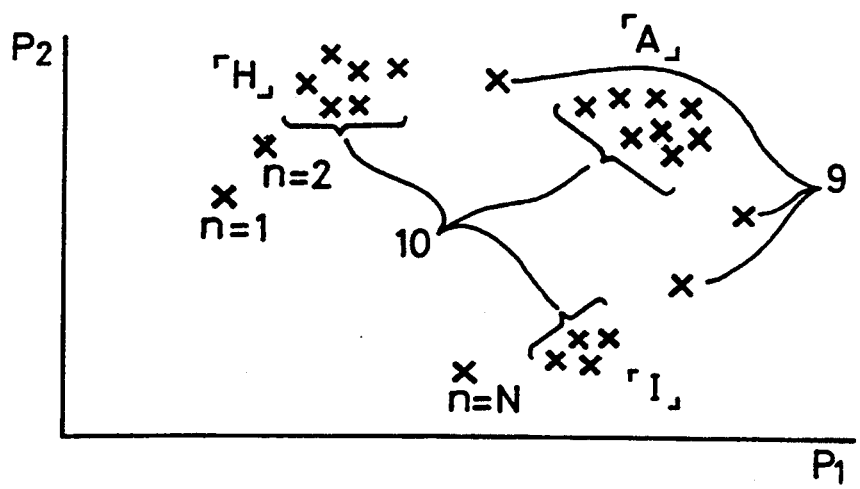
FIG. 2 is a diagram showing, by way of example, a dot sequence in a parameter space.
Figure 3:
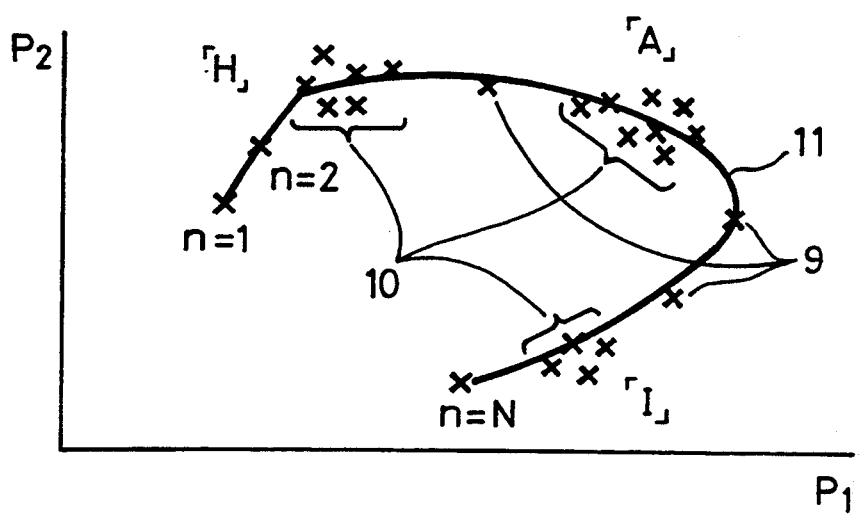
FIG. 3 is a diagram showing, by way of example, a trajectory in a parameter space.
Figure 4:
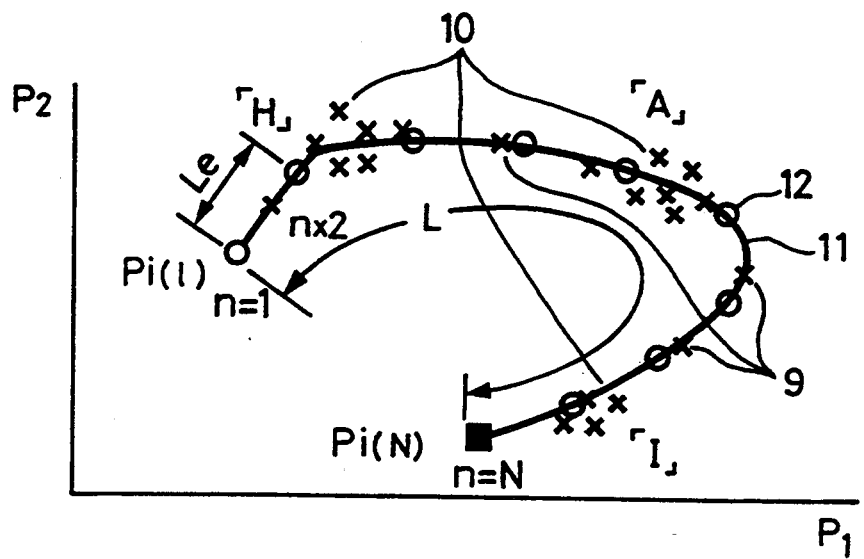
FIG. 4 is a diagram showing, by way of example, re-sampled points on the trajectory.
Figure 5:
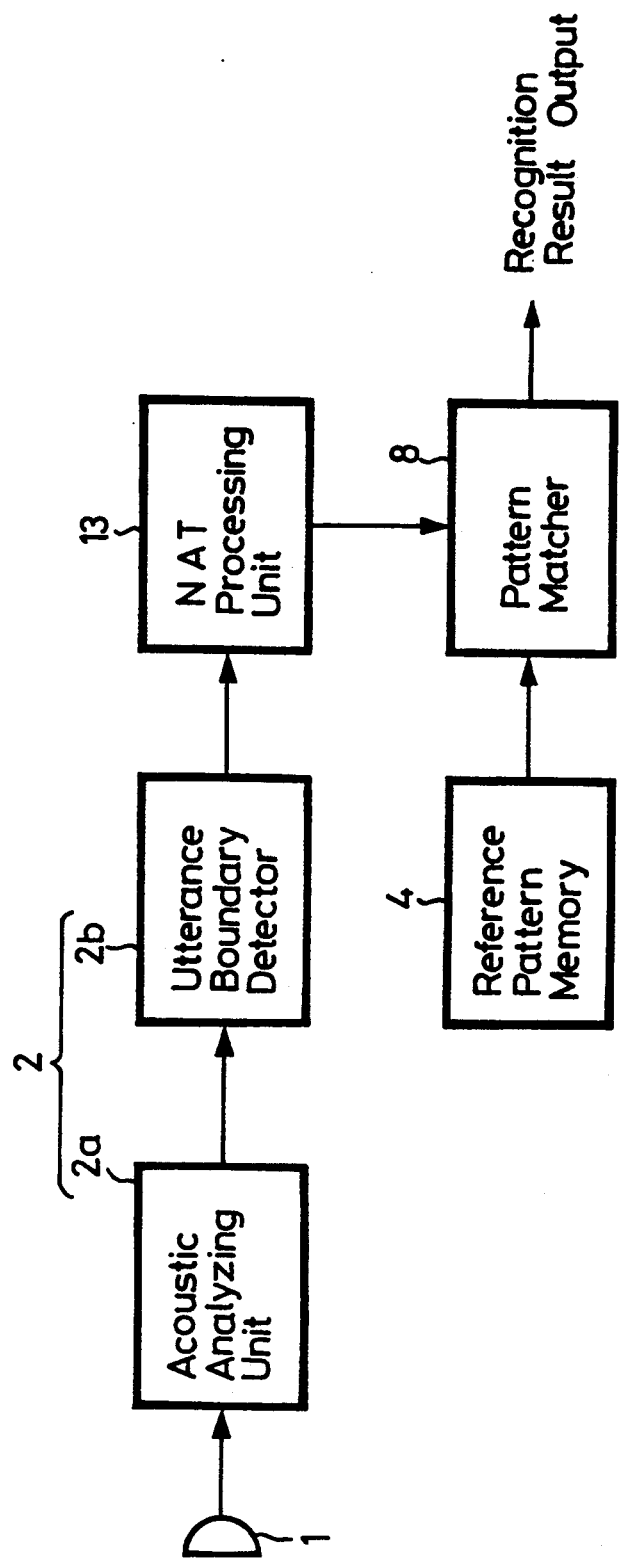
FIG. 5 is a block diagram of a conventional speech recognition system which carries out the NAT process
Figure 6:
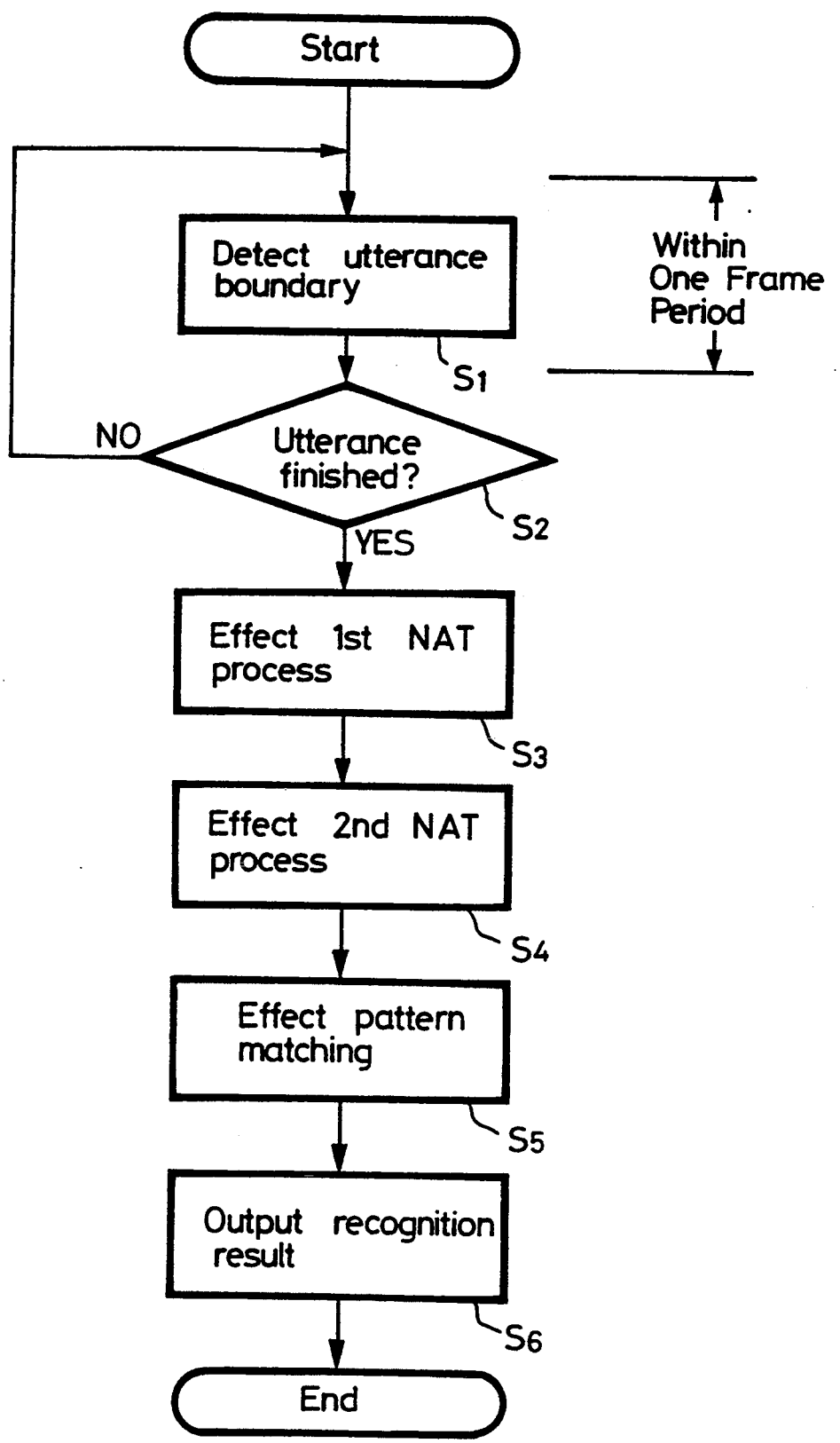
FIG. 6 is a flowchart of the speech recognition system shogun in FIG. 5.
Figure 7:
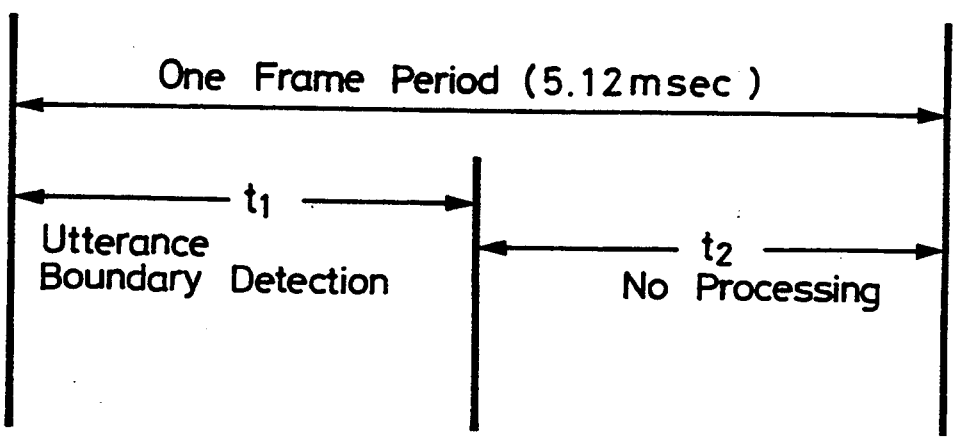
FIG. 7 is a diagram showing an utterance boundary detection process effected in one frame period by the conventional speech recognition system.
Figure 8:
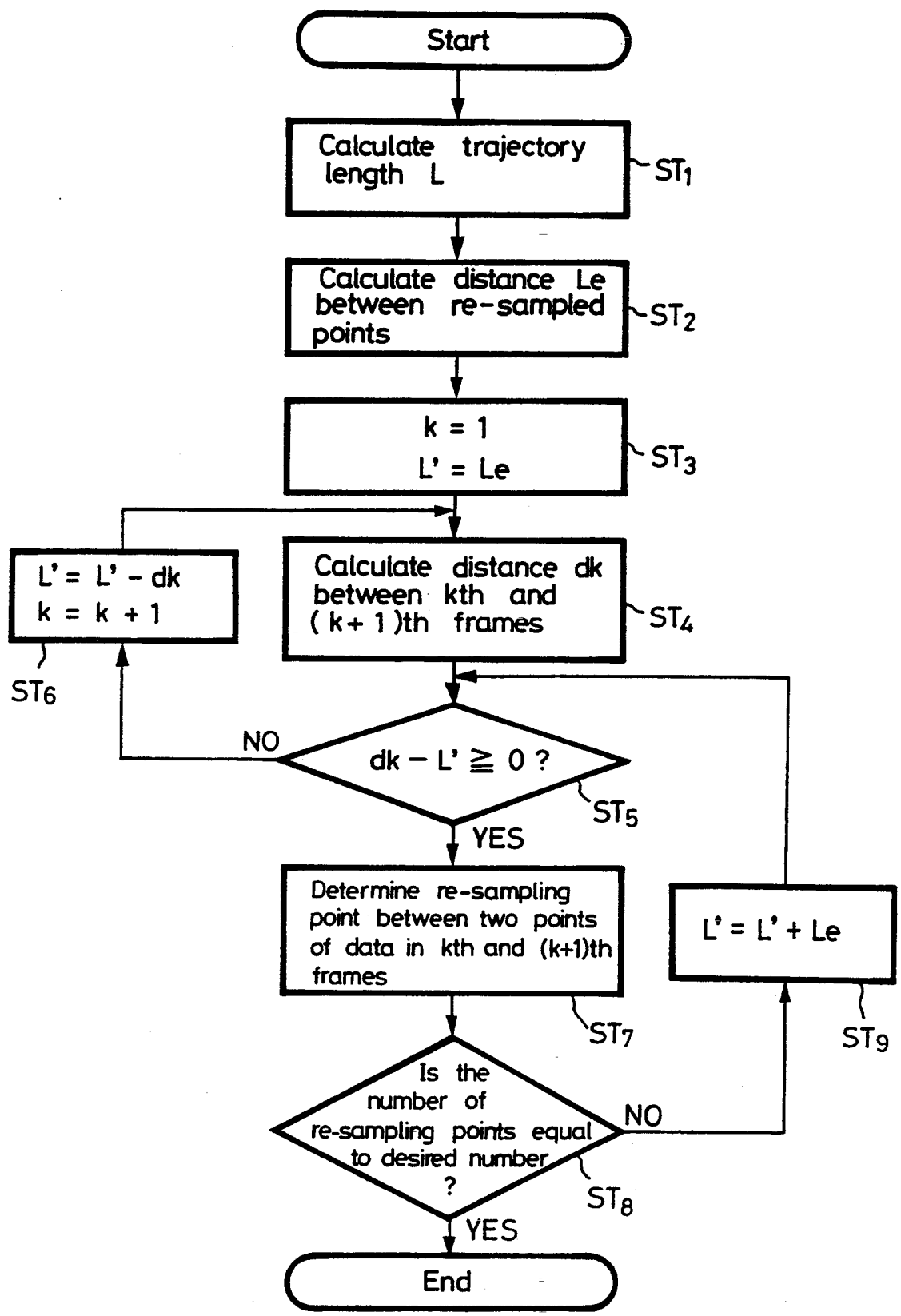
FIG. 8 is a flowchart of the NAT process.
Figure 9:
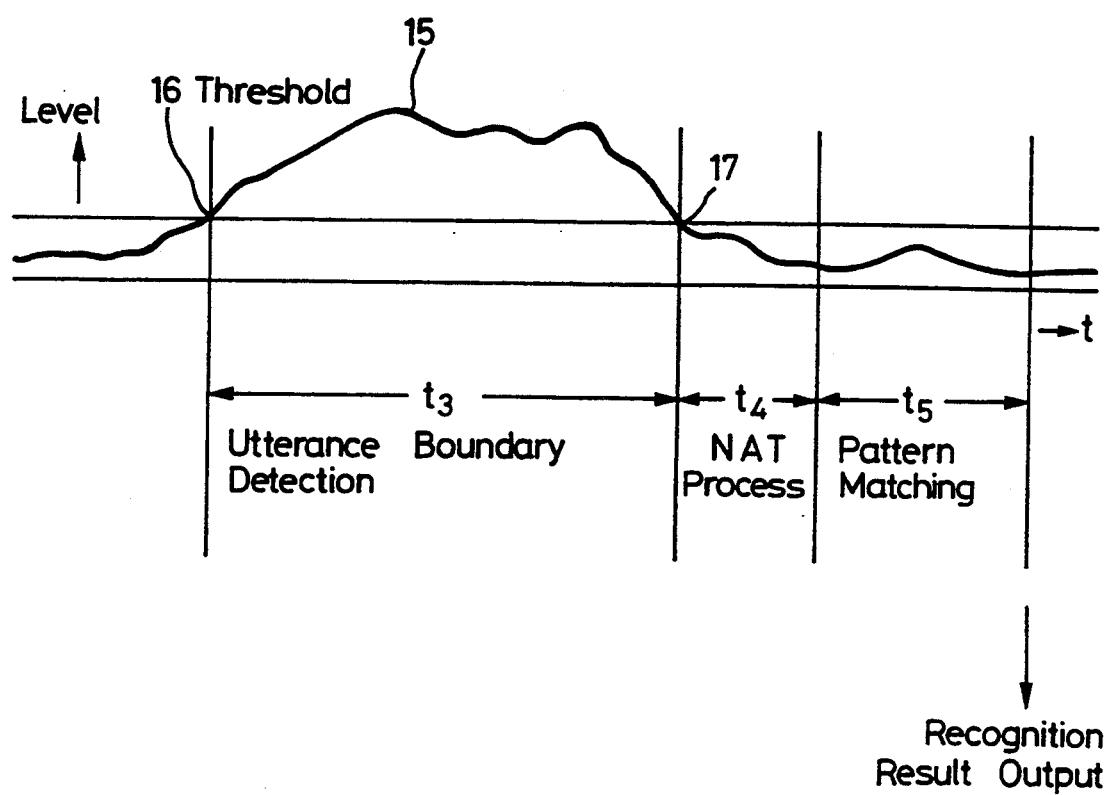
FIG. 9 is a diagram showing the speech recognition sequence carried out by the conventional speech recognition system.
Figure 12:
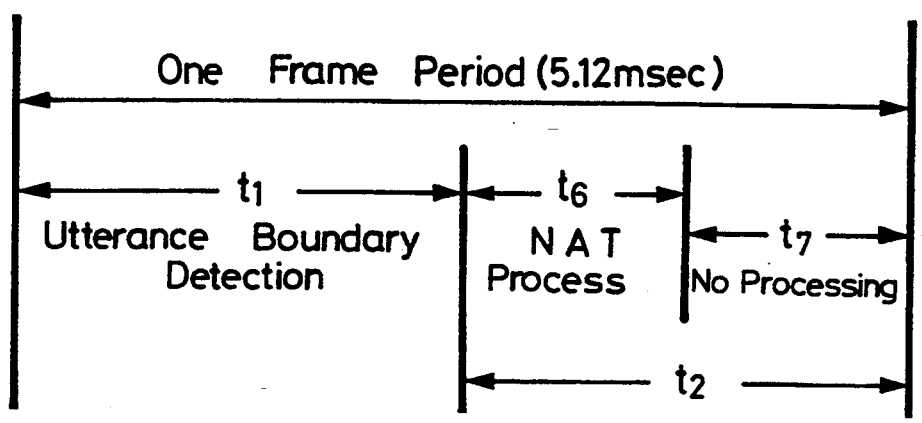
FIG. 12 is a diagram showing an utterance boundary detection process and a sequential NAT process effected in one frame period by the speech recognition system shown in FIG. 10.

Heretofore, since the distances between the resampled points are calculated from the length of the trajectory, the NAT process cannot be started until after the end point of the input utterance is detected. Therefore, the NAT process begins to be carried out after the end point of the input utterance is detected, as shown in FIG. 9. According to the present invention, however, as shown in FIG. 12, the acoustic analyzer 2a sends the features of the input utterance to the utterance boundary detector 2b in each frame period, and the utterance boundary detector 2b detects an utterance boundary in a short time interval $t_1$ (FIG. 12) within one frame period.

Following utterance boundary detection in the time interval $t_1$, the sequential NAT process in the step STE$_2$ is effected in a time interval $t_6$ which would otherwise be within the time interval $t_2$ in which no processing has heretofore been carried out within one frame period. No processing is executed in a remaining time interval $t_7$ in the frame period.

In this manner, the period of time required for the speech recognition system to output a recognition result is much shorter than would be if the NAT process were started after the end point 17 of the input utterance 15 is determined.

According to the present invention, in order realize the above rather than calculating the distances Le between the re-sampled points, the trajectory 11 is resampled with a predetermined fixed length C. In addition, each time feature parameters are obtained in each frame period, the differences between the feature parameters in the preceding frame and those of the present frame, i.e., the distance between two points of the preceding and present frames on the trajectory, are calculated, and resampled points are determined between the two points if possible.

The above procedure is repeated in each frame up to the end point 17 where the input utterance is finished. In this manner, the sequential NAT process is finished when the input utterance is finished. The sequential NAT process will be described later on with reference to FIG. 13.

Figure 11:
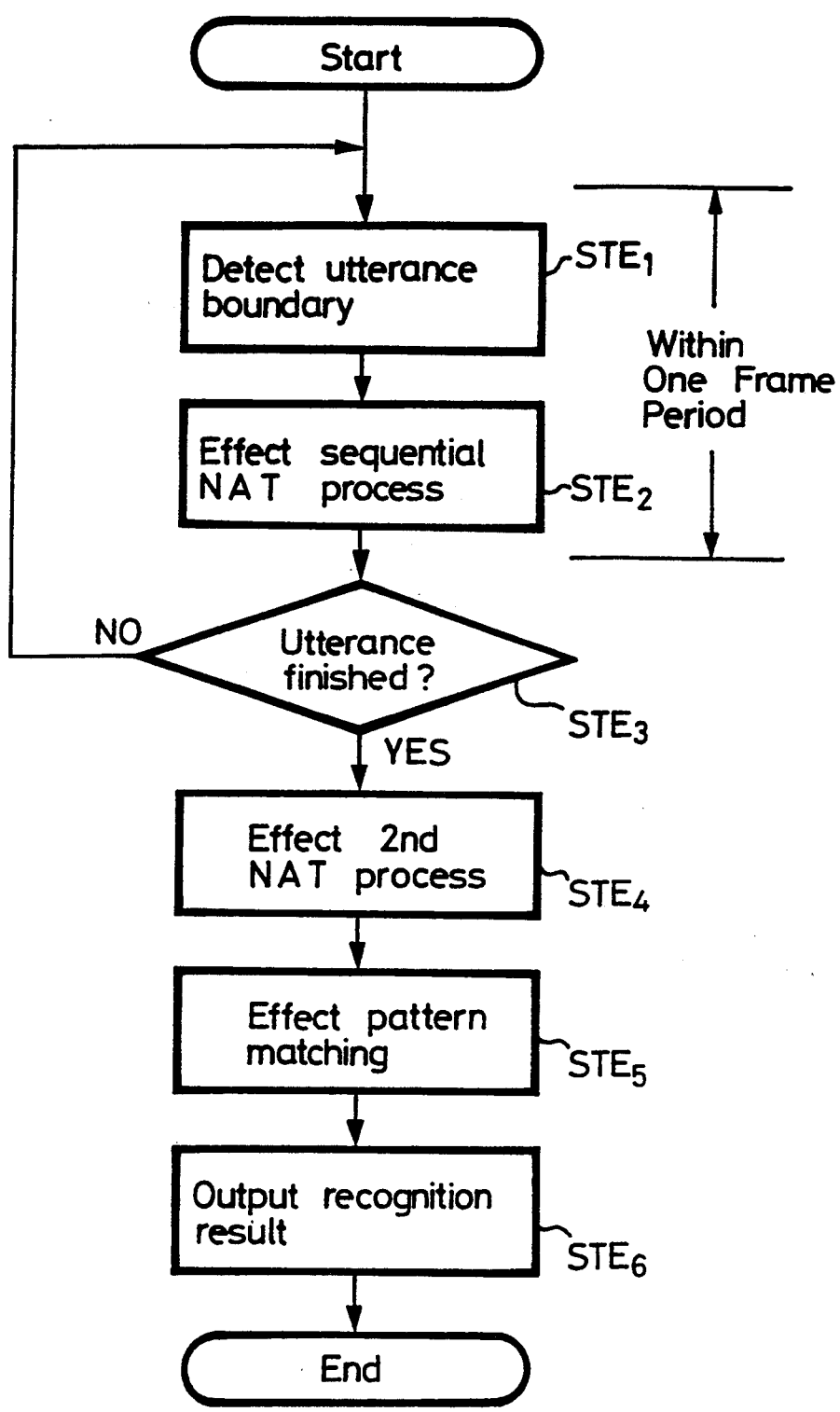
FIG. 11 is a flowchart of an operation sequence of the speech recognition system shown in FIG. 10.

After the second step $STE_2$ in FIG. 11, a CPU (not shown) determines, in a step $STE_3$, whether the input utterance is finished or not. If not, then the processing goes back to the step $STE_1$. If finished, then the processing proceeds to a step $STE_4$ in which a second NAT process is carried out, if necessary, by the NAT processing unit 13b shown in FIG. 10. After the second NAT process, the pattern matcher 8 effects pattern matching in a step $STE_5$, and outputs a recognition result in a step $STE_6$, whereupon the speech recognition sequence comes to an end.

Figure 13:
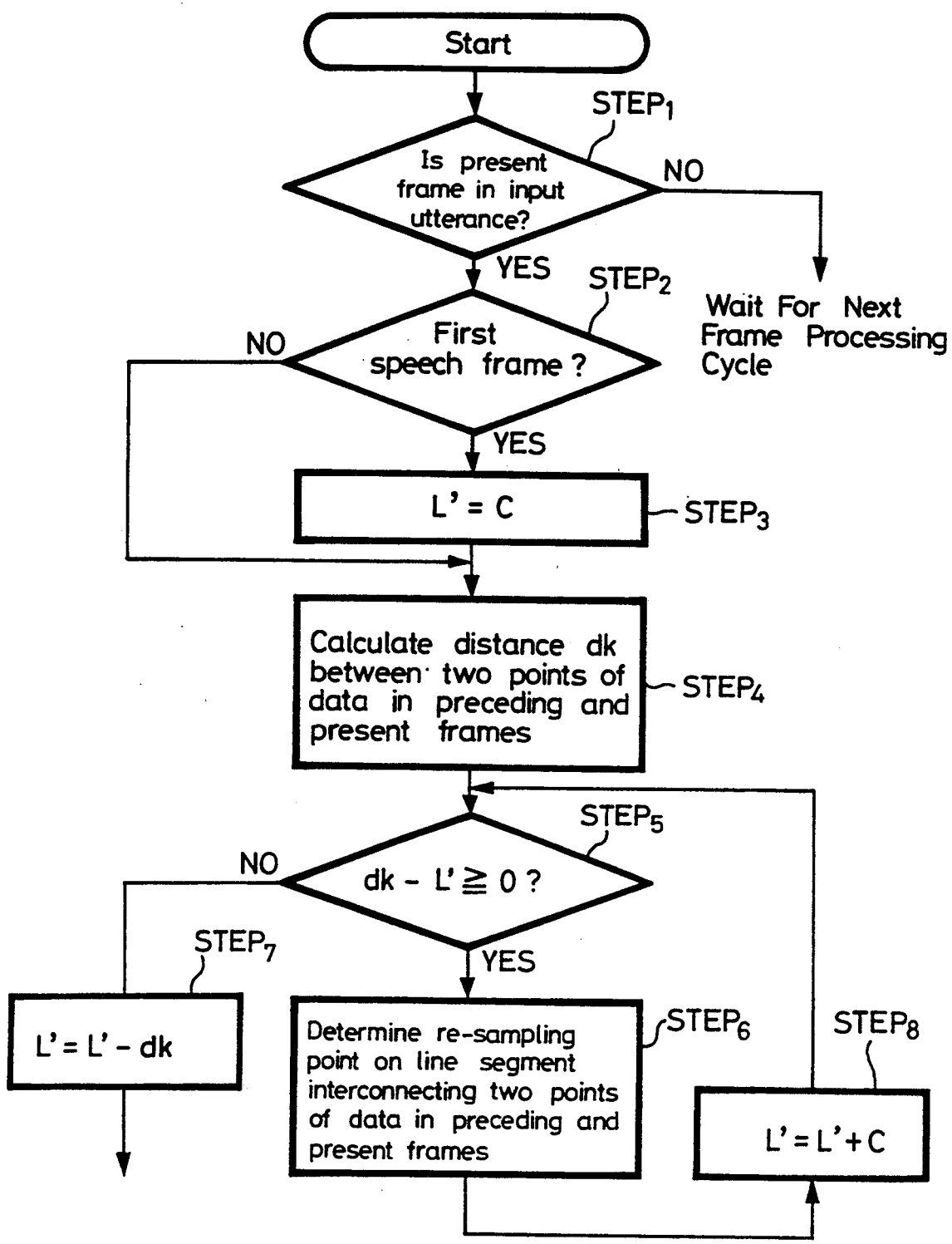
FIG. 13 is a flowchart of the sequential NAT process.

The sequential NAT process in the step $STE_2$ shown in FIG. 11 will be described in detail below with reference to FIG. 13.

When the sequential NAT process $STE_2$ in FIG. 11 is started, the sequential NAT processing unit 13a determines whether the present frame is in the input utterance 15 or not in a step $STEP_1$. If not, then the sequential NAT processing unit 13a waits for a next frame processing cycle. If the present frame is in the input utterance 15, then the processing goes to a step $STEP_2$.

In the step $STEP_2$, the sequential NAT processing unit 13b determines whether the present frame is a first speech frame or not ? If not, then the processing goes to a step $STEP_4$. If the present frame is a first speech frame, then the processing goes to a step $STEP_3$.

In the step $STEP_3$, the sequential NAT processing unit 13a sets L' to L'=C where C is a predetermined constant representative of the distance between re-sampled points. At this time, the sequential NAT processing unit 13a does not determine the length of the trajectory 11. Rather, at the time the acoustic parameters are obtained, the sequential NAT processing unit 13a re-samples the trajectory 11 successively with the predetermined constant C.

In the step $STEP_4$, the sequential NAT processing unit 13a calculates the distance dk between two points composed of the data in the preceding and present frames.

Thereafter, the sequential NAT processor 13a determines whether $dk - L' \geq 0$ or not in a step $STEP_5$. If not, then the sequential NAT processor 13a sets the value L' to L'=L'−dk in a step $STEP_7$, and then the sequential NAT processing unit 13a waits for a next frame processing cycle. If $dk - L' \geq 0$ in the step $STEP_5$, then the processing proceeds to a step $STEP_6$.

In the step $STEP_6$, the sequential NAT processor 13a determines a re-sampling point on a line segment which interconnects two points composed of the data in the preceding and present frames.

Thereafter, the sequential NAT processor 13b sets the value L' to L'=L'+C in a step $STEP_8$, and then processing goes back to the step $STEP_5$. In this manner, the sequential NAT processor 13a determines as many resampling points as possible between two points composed of the data in the preceding and present frames.

Figure 14:
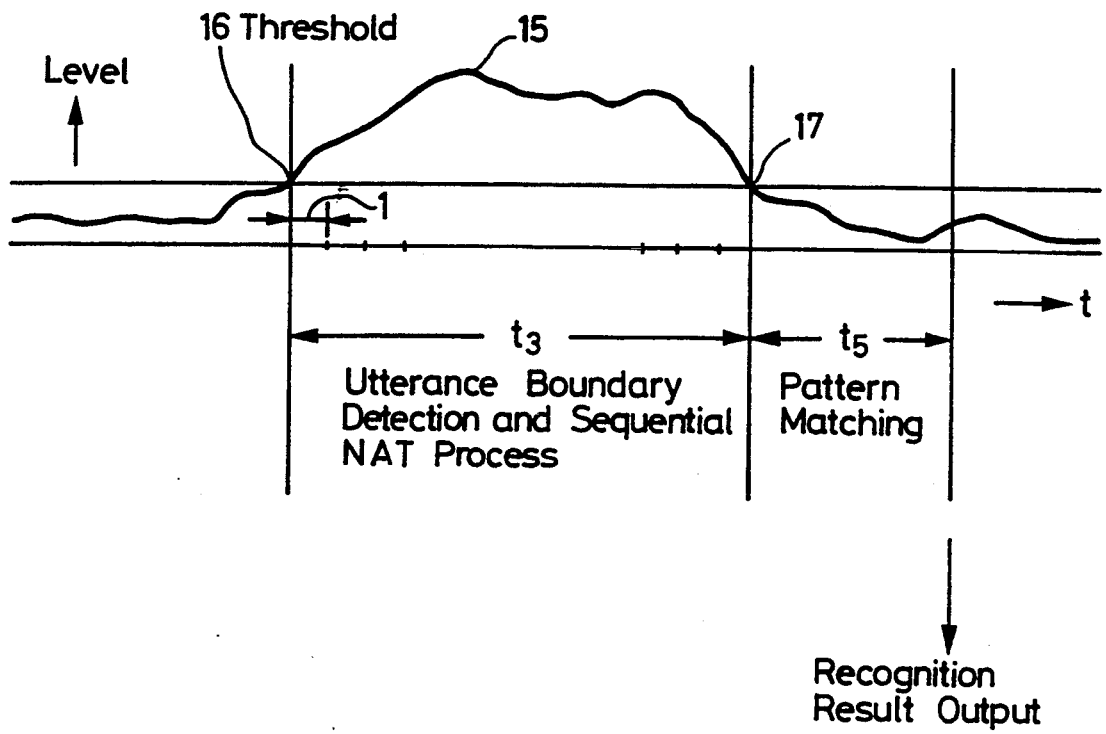
FIG. 14 is a diagram showing the speech recognition sequence, including a sequential NAT process, carried out by the speech recognition system shown in FIG. 10.

FIG. 14 shows the speech recognition sequence, including the sequential NAT process, carried out by the speech recognition system shown in FIG. 10. The second NAT process of the NAT processor 13b is not carried out in the speech recognition sequence shown in FIG. 14. As shown in FIG. 14, the sequential NAT process, which is similar to the NAT process effected in the time interval $t_4$ in FIG. 9, is completed within the time interval $t_3$ in which the utterance 15 is finished. Therefore, the time required for the speech recognition sequence to output a recognition result is equal to the sum of the time intervals $t_3$, $t_5$, which is shorter than the sum of the time intervals $t_3$, $t_4$, $t_5$ required by the conventional speech recognition system by the time interval $t_4$.

Furthermore, it has heretofore been necessary to hold the utterance feature parameters at least from the start point to the end point of the utterance, and the parameter memory has been required to have a storage area for storing those utterance feature parameters. According to the present invention, however, since the sequential NAT process is executed in the frame period, it requires only the utterance feature parameters in the preceding and present frames. Therefore, the storage area of the memory required for storing those utterance feature parameters may be much smaller than that which has been required by the conventional speech recognition system.

Figure 15:
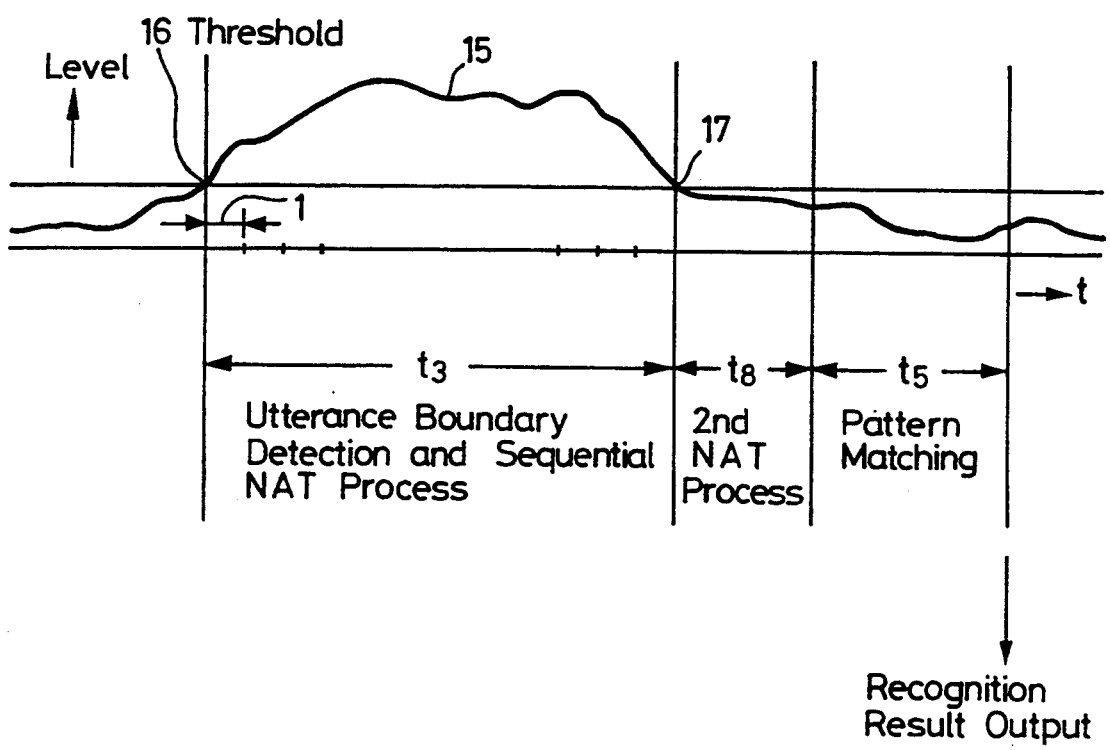
FIG. 15 is a diagram showing the speech recognition sequence, including a sequential NAT process and a second NAT process, carried out by the speech recognition system shown in FIG. 10.

If the second NAT process is carried out by the NAT processing unit 13b as indicated by the dotted lines in FIG. 10 and in the step $STE_4$ in FIG. 11, then it is effected in a time interval $t_8$ as shown in FIG. 15.

As described above, when the speech recognition system according to the present invention operates to recognize an input utterance, it starts producing an input speech pattern before the end of the input utterance is detected. Therefore, the overall time required for the speech recognition system to output a recognition result is shortened.

In addition, the speech recognition system is not required to hold utterance feature parameters, but is only required to store data of re-sampled points produced by the sequential NAT process. Since the amount of data to be stored is relatively small, the storage capacity of the parameter memory of the speech recognition system may be relatively small.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A speech recognition system comprising:
   acoustic analyzing means for producing a time sequence of acoustic parameters from an input speech signal in an utterance boundary thereof, and estimating a trajectory in a parameter space from said time sequence of acoustic parameters;
   processing means for re-sampling said trajectory in said parameter space at predetermined constant intervals sequentially each time said acoustic parameters are produced by said acoustic analyzing means, thereby producing an input utterance pattern; and
   matching means for matching said input utterance pattern with reference speech patterns to recognize the input speech signal.

2. A speech recognition system according to claim 1, further including utterance boundary detecting means for detecting said utterance boundary of the input speech signal, said processing means comprising means for re-sampling said trajectory while said utterance boundary is being detected by said utterance boundary detecting means.

* * * * *